United States Patent [19]
Sutter et al.

[11] Patent Number: 5,760,934
[45] Date of Patent: Jun. 2, 1998

[54] RING NETWORK FOR TRANSMITTING WAVELENGTH-MULTIPLEXED INFORMATIONS

[75] Inventors: Alain Sutter, Paris; André Hamel; Laurent Blain, both of Lannion, all of France

[73] Assignee: France Telecom, Paris, France

[21] Appl. No.: 643,459

[22] Filed: May 8, 1996

[30] Foreign Application Priority Data

May 17, 1995 [FR] France ................... 95 05834

[51] Int. Cl.$^6$ ............... H04J 14/02; H04B 10/12
[52] U.S. Cl. ............ 359/119; 359/124; 359/125; 359/127; 359/161; 359/179
[58] Field of Search ................. 359/110, 124, 125, 127, 119, 161, 164, 166, 167, 174, 176, 179; 370/222, 424, 258

[56] References Cited

U.S. PATENT DOCUMENTS

| | | | |
|---|---|---|---|
| 5,369,516 | 11/1994 | Uchida | 359/125 |
| 5,576,875 | 11/1996 | Chawki et al. | 359/125 |
| 5,625,478 | 4/1997 | Doerr et al. | 359/125 |

FOREIGN PATENT DOCUMENTS

| | | | |
|---|---|---|---|
| 475135 | 3/1992 | European Pat. Off. | 359/119 |
| 2 707 066 | 12/1994 | France . | |
| 0090839 | 5/1983 | Japan | 359/119 |
| 405102928 | 4/1993 | Japan | 359/119 |

OTHER PUBLICATIONS

IEEE International Conference on Communications '93, vol. 2/3, pp. 1245–1251, May 23–26, 1993, A.F. Elrefaie, "Multiwavelength Survivable Ring Network Architectures".
World Telecommunications Congres ISS '95, vol. 2, pp. 392–396, Apr. 23–28, 1995, F. Tillerot, et al., "Introduction of the WDM Technique in SDH Networks".
Supercomm/ICC '92, vol. 3, pp. 1173–1179, Jun. 14, 1992, S. Wagner, et al., "Multiwavelength Ring Networks for Switch Consolidation and Interconnection".
Globecom '91, vol. 1, pp. 602–606, Dec. 2–5, 1991, T. Nakashima, et al., "Photonic Access Network Architecture".

*Primary Examiner*—Leslie Pascal
*Attorney, Agent, or Firm*—Oblon, Spivak, McClelland, Maier & Neustadt, P.C.

[57] ABSTRACT

This ring network for wavelength-multiplexed information transmission, comprises two optical fibres (F1, F2) passing through nodes (N1 to N4) of the network and traversed in the opposite direction by informations, electronic add-drop multiplexers (ME1 to ME4) or ADM, each ADM supplying information to other ADM's, of the network at given wavelengths and optical add-drop multiplexers (M01 to M04) or OADM, each OADM adding to the fibres the informations from the associated ADM and extracting from said fibres the informations intended for said ADM. Application to optical telecommunications.

11 Claims, 4 Drawing Sheets

RING NETWORK FOR TRANSMITTING WAVELENGTH-MULTIPLEXED INFORMATIONS

TECHNICAL FIELD

The present invention relates to a ring network for transmitting wavelength-multiplexed informations.

It applies to the field of optical telecommunications and more particularly to telecommunications using the synchronous digital hierarchy or SDH standard.

PRIOR ART

The SDH transmission standard permits the visibility of tributaries in the frame, which has led to the development of add-drop multiplexers known as ADM. These ADM's have two aggregate interfaces, which are respectively called the east interface and the west interface and make it possible to drop, add or relay paths, such as for example VC-12 paths, which are transported by a line frame circulating between the aggregate interfaces. The ADM's can be used for constructing a ring network using an electronic technology. Adjacent ADM's are then connected pairwise and all the network nodes form a ring.

An information transmission ring network organization is of economic interest and leads to a better assurance of protection against route failures. In a ring network, any node can be reached from a second node using two paths which are physically separate. This is used for providing protection against route failures.

Several protection scenarios are being standardized.

Thus, for example, protection scenarios known as "subnetwork connection protection" and "1+1 VC trail protection" are known, which have the advantage of simplicity, because they involve no protocol between the ring nodes.

In both cases an information transmitted between two nodes is sent on two contradirectional fibres by east and west aggregate interfaces and a selection takes place on arrival with respect to criteria permitting the determination of the best path.

Thus, the traffic has two physical routes on the two arcs of the ring, which provides a protection against any traversed node or single route failure.

The transport capacity on the ring is limited for such protection types to the line frame transport capacity.

MS-DPRING and MS-SPRING protection scenarios are known making it possible, with the aid of a protection at the multiplexing section and a protocol, to have a greater transport capacity on the ring than in the case of the line frame.

The increase in the transport capacity is a function of the distribution of the traffic, but said transport capacity remains a limiting factor for such a network.

Thus, in a network using electronic technology, a single frame is subdivided between all the nodes and stations and it is necessary to "superimpose" rings in order to increase the capacity of the traffic between stations.

Spectral routing rings are known which do not suffer from the aforementioned disadvantage. In such rings, several frames circulate and are associated with different wavelengths.

Use is then made of wavelength multiplexing, which permits a switching of optical signals due to the possibility of deriving wavelengths.

In such spectral routing rings, each station comprises an optical component known as an optical add-drop multiplexer or OADM.

An OADM is able to filter, i.e. derive, one or more wavelengths transiting on a spectral routing ring.

The optical technologies usable for producing an OADM can be placed in two main categories, namely:

those using a fixed filtering, an OADM then being produced for deriving and inserting a fixed wavelength value and those using tunable filtering, where the derived and inserted wavelength or wavelengths are determined by an external control (voltage or frequency of an electric signal in exemplified manner).

For the fixed filtering, the following technologies can be used:

diffraction gratings (cf. document (1) which, like the other documents referred to hereinafter, appears at the end of the present description), multidielectric filters (cf. document (2)), photo-inscribed Bragg grating filters (cf. document (3)).

The technologies usable for tunable filtering are:

solid Fabry-Perot filters integrated optical filters with an acousto-optical effect (cf. document (4)) or electro-optical effect.

The applications of wavelength multiplexing described in documents (5) and (6), are based on the same organization principle of a network.

In a spectral routing ring network, the electronic ADM's are replaced by

A wavelength is allocated to each station of the network and the informations intended for a station of the network are grouped in a STM-N frame (where N e.g. assumes the value 1 or 4 or 16) and are transmitted in normal and standby optical fibres provided in such a spectral routing network by means of a given wavelength laser source.

In the station in question, the OADM is dedicated to this wavelength. If the wavelength is completely derived by the OADM, the return informations can use the same wavelength.

The capacity of a spectcal routing ring, also known as a muitcoloured ring, is thus superior to that of a ring using electronic technology.

In a spectral routing ring, the equipments used are point-to-point transmission systems on an optical fibre, because installation has taken place of several point-to-point links on a physical ring infrastructure, each link using a different wavelength.

In view of the fact that at the head of the network, the signals are injected on normal and standby fibres in contradirectional manner, in the case of a breaking of an optical fibre, the signals are recovered on the standby fibre by optical or electronic switching on reception.

It should be noted that the SDH standard provides no such switching.

Only a protection known as multiplex section protection or MSP is standardized, but it relates to the protection of a line section and cannot be applied in the case of a spectral routing ring. The management of such a ring is different from that of an electronic technology ring.

It should be noted that spectral routing can also be installed on a bidirectional ring.

Thus, in a spectral routing ring, each OADM is associated with an equipment known as a terminal multiplexer and it is necessary to have a large number of terminal multiplexers in order to be able to connect two random stations of the ring.

DESCRIPTION OF THE INVENTION

The invention aims at obviating the aforementioned disadvantages by proposing a ring network intended for the transmission of wavelength-multiplexed informations and having a greater capacity than the known electronic technology rings, whilst requiring less equipments than the known spectral routing rings.

The invention preferably makes use of the SDH transmission standard and, under these conditions, it is able to implement it with standard equipments with respect to said standard, using wavelength multiplexing, so that the transmission capacity is increased.

In a preferred embodiment of the invention use is made of multiplex section protection making it possible to retain a total protection against any simple failure of a node of the ring or a route thereof.

The invention has the advantages of permitting a logic organization of the ring independent of the order of nodes given by the physical topology of the network and is compatible with a management of the ring with the aid of the SDH transmission standard.

More specifically, the present invention relates to a ring network intended for the transmission of informations in optical form and which are wave-length multiplexed, said network incorporating optically interconnected nodes and being characterized in that it also comprises:

a first optical fibre forming a ring, which successively passes through the nodes of the network and which is to be traversed by the informations in a first direction, a second optical fibre forming a ring and which passes successively through the nodes of the network and which is traversed by the informations in a second direction opposite to the first direction, electronic add-drop multiplexers, known as ADM, each ADM being able to supply informations to other ADM's of the network, respectively at given wavelengths, each ADM incorporating:

a first aggregate interface for the transmission of informations to be added in the first fibre in the direction of an associated ADM and the reception of informations dropped from the second fibre and coming from the said associated ADM, and a second aggregate interface for the transmission of informations to be added in the second fibre, in the direction of another associated ADM and for the reception of informations dropped from the first fibre and coming from said associated other ADM, optical add-drop multiplexers known as OADM's, respectively associated with the ADM's, each OADM being able to add to the first and second fibres the informations coming from the associated ADM and drop from said fibres the informations intended for said associated ADM and means for managing the network, a configuration of the network defining a bidirectional link between an interface of each ADM and an interface of the associated ADM, one transmission wavelength being allocated to each interface.

According to a preferred embodiment of the invention, the network is adapted to the SDH standard.

Preferably, in each ADM, the first aggregate interface is also able
to transmit informations in the direction of the associated ADM by means of the second fibre and
receive the informations coming from said associated ADM by means of the first fibre and the second aggregate interface is also able
to transmit informations in the direction of the other associated ADM by means of the first fibre and
receive the informations coming from said other associated ADM by means of the second fibre, each bidirectional link between two nodes being autosecurized by 1+1 multiplex section protection.

In this case, in order to simplify the implementation of the invention, it is preferable for each ADM, for the transmissions of the informations intended for an associated ADM by means of the first and second fibres to take place at the same wavelength.

According to a first embodiment of the invention, for each ADM, the transmission of informations intended for an associated ADM and the transmission of informations from said associated ADM and intended for the ADM take place at the same wavelength.

According to a second embodiment, for each ADM, the transmission of informations intended for an associated ADM and the transmission of informations from said associated ADM and intended for said ADM take place at different wavelengths.

In a particular embodiment of the invention, at least one of the ADM's also makes it possible to relay informations coming from another ADM and intended for an ADM associated with said other ADM.

In this case, in order to protect against a failure or breakdown the ADM relaying the informations, the latter are also transmitted by said other ADM both by the first aggregate interface and the second aggregate interface of said other ADM.

Use is then made of the path protection known from the SDH standard.

In the network according to the invention, at least one of the links can be established between two physically non-adjacent nodes of the network. The "logic distribution" of the nodes, i.e. the allocation of wavelengths, is independent of the physical installation of the nodes and can therefore differ from said physical installation.

Therefore there is a complete freedom for logically associating the ADM's in order to optimize the configuration of the network and in particular reduce the traffic relayed by the nodes.

The OADM's can comprise optical devices (e.g. diffraction gratings and filters) making it possible to add and drop fixed wavelengths or, conversely, other tunable optical devices for adding and dropping wavelengths which can thus be selected.

BRIEF DESCRIPTION OF THE DRAWINGS

The invention is described in greater detail hereinafter relative to non-limitative embodiments and the attached drawings, wherein show.

DETAILED DESCRIPTION OF EMBODIMENTS

Figure 1:
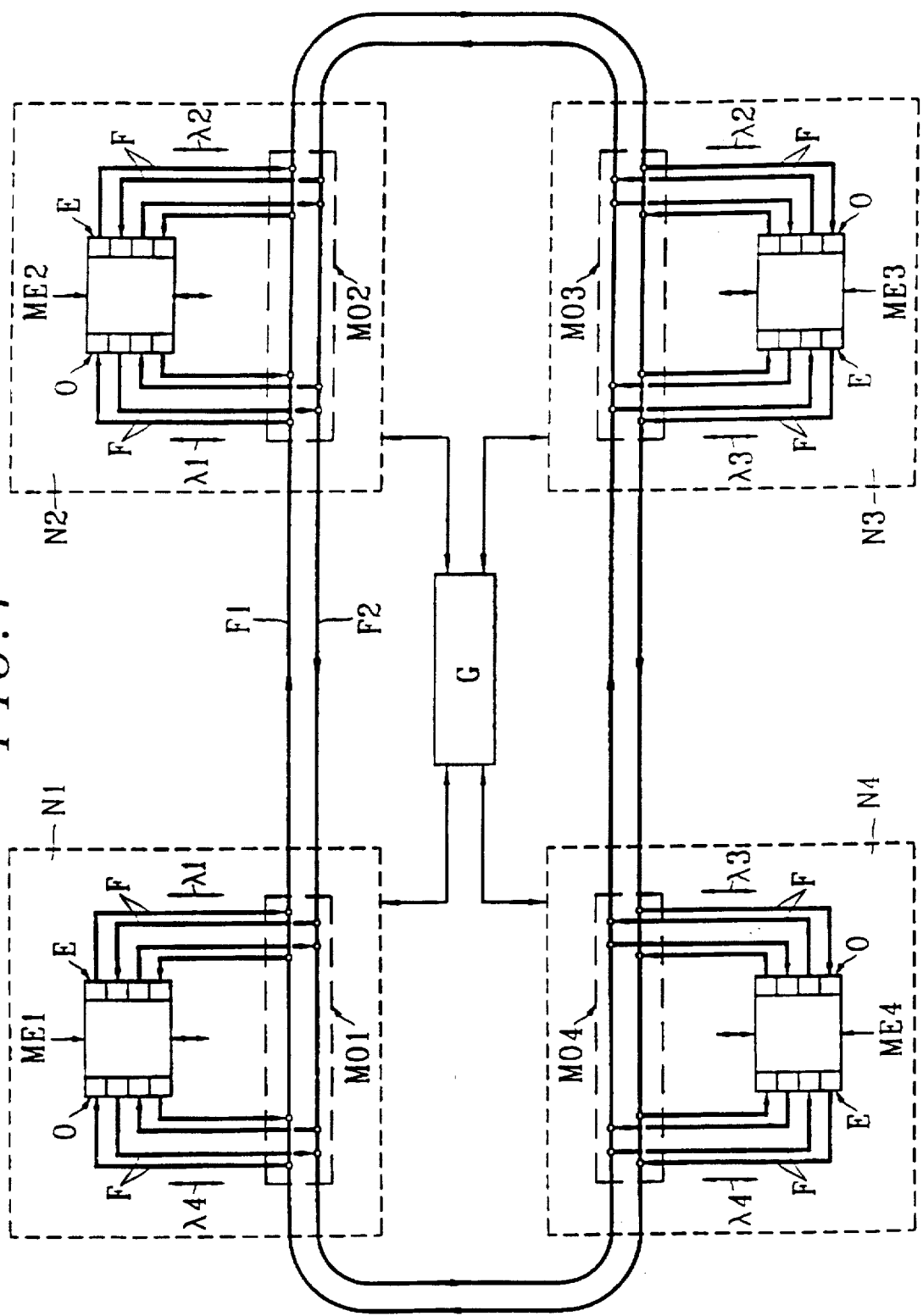
FIG. 1 A diagrammatic view of an embodiment of the ring network according to the invention.

The ring network according to the invention and which is diagrammatically shown in FIG. 1 is intended for the transmission of wavelength-multiplexed informations in optical form. This network comprises several nodes or stations and there are four of these in the example shown in FIG. 1. These nodes designated N1, N2, N3 and N4 are arranged in this order along the network, node N4 being adjacent to node N1.

This network also comprises a first optical fibre F1 and a second optical fibre F2, each forming a ring passing successively through the network nodes Ni (i ranging from 1 to 4).

Fibre F1 is to be traversed in a first direction by informations, whilst second fibre F2 is to be traversed by informations in a second direction opposite to the first.

Each node Ni comprises an electronic add-drop multiplexer or ADM, which carries the reference MEi (i ranging from 1 to 4). In known manner, the ADM's are connected to other electronic equipments symbolized by double arrows.

Bidirectional links known as "coloured sections" are defined between each network node and other nodes of said network.

At the maximum, each node is connected to two other nodes because, as will be shown hereinafter, each ADM only has two aggregate interfaces.

In the example shown in FIG. 1, four bidirectional links are defined:

a link between nodes N1 and N2, a link between nodes N2 and N3, a link between nodes N3 and N4 and a link between nodes N4 and N1.

According to the present invention, one wavelength is allocated to the link of a node to another node of the network. In the example shown, this wave-length is also allocated to the reverse link.

Thus, the wavelengths $\lambda 1$, $\lambda 2$, $\lambda 3$ and $\lambda 4$ are respectively allocated to the bidirectional links between nodes N1 and N2, between nodes N2 and N3, between nodes N3 and N4 and nodes N4 and N1.

The network also comprises management means G, each of which controls the nodes N1 to N4 and more specifically the electronic equipments contained in said nodes.

In each of the nodes N1 to N4, the ADM comprises:

a first aggregate interface called the "east interface", designated E and intended
   to transmit informations which are to be added to the filter F1 in the direction of an associated ADM and also
   receive informations dropped from said filter F2 and coming from said associated ADM and a second aggregate interface called "east interface", designated 0 and intended
   to transmit informations to be added in fibre F2 in the direction of another associated ADM and also
   receive informations dropped from the filter F1 and coming from said other associated ADM.

In the example shown, the ADM designated MEi, the index i ranging from 1 to 3, supplies informations to the ADM designated MEi+1 and vice versa.

More specifically, the east interface E of the ADM designated MEi transmits informations at the wavelength $\lambda i$, intended for the west interface 0 of the ADM designated MEi+1 and vice versa.

The ADM designated ME4 transmits informations at wavelength $\lambda 4$ intended for the ADM designated ME1 and vice versa.

Thus, the east interface E of the ADM designated ME4 transmits informations at the wavelength $\lambda 4$ intended for the west interface 0 of the ADM designated ME1 and vice versa.

In addition to the equipments referred to hereinbefore, each network node Ni (i ranging from 1 to 4) comprises an optical add-drop multiplexer or OADM, designated MOi.

This OADM constitutes an interface between the associated ADM and the optical fibres F1 and F2. Each OADM is connected by means of the optical fibres F to the east and west interfaces of the associated ADM.

Each OADM is able to add to the fibres F1 and F2 the informations coming from the ADM associated therewith and drop from said fibres the informations which are circulating therein and which are intended for said associated ADM, as will be shown hereinafter.

The network according to the invention and which is diagrammatically shown in FIG. 1 is adapted to the synchronous digital hierarchy standard or SDH standard.

It should be noted that in the network of FIG. 1, the OADM's are interconnected by the pair of optical fibres F1 and F2, hence an optical continuity of the network, whereas a known network using electronic technology does not have such an optical continuity.

Figure 2:
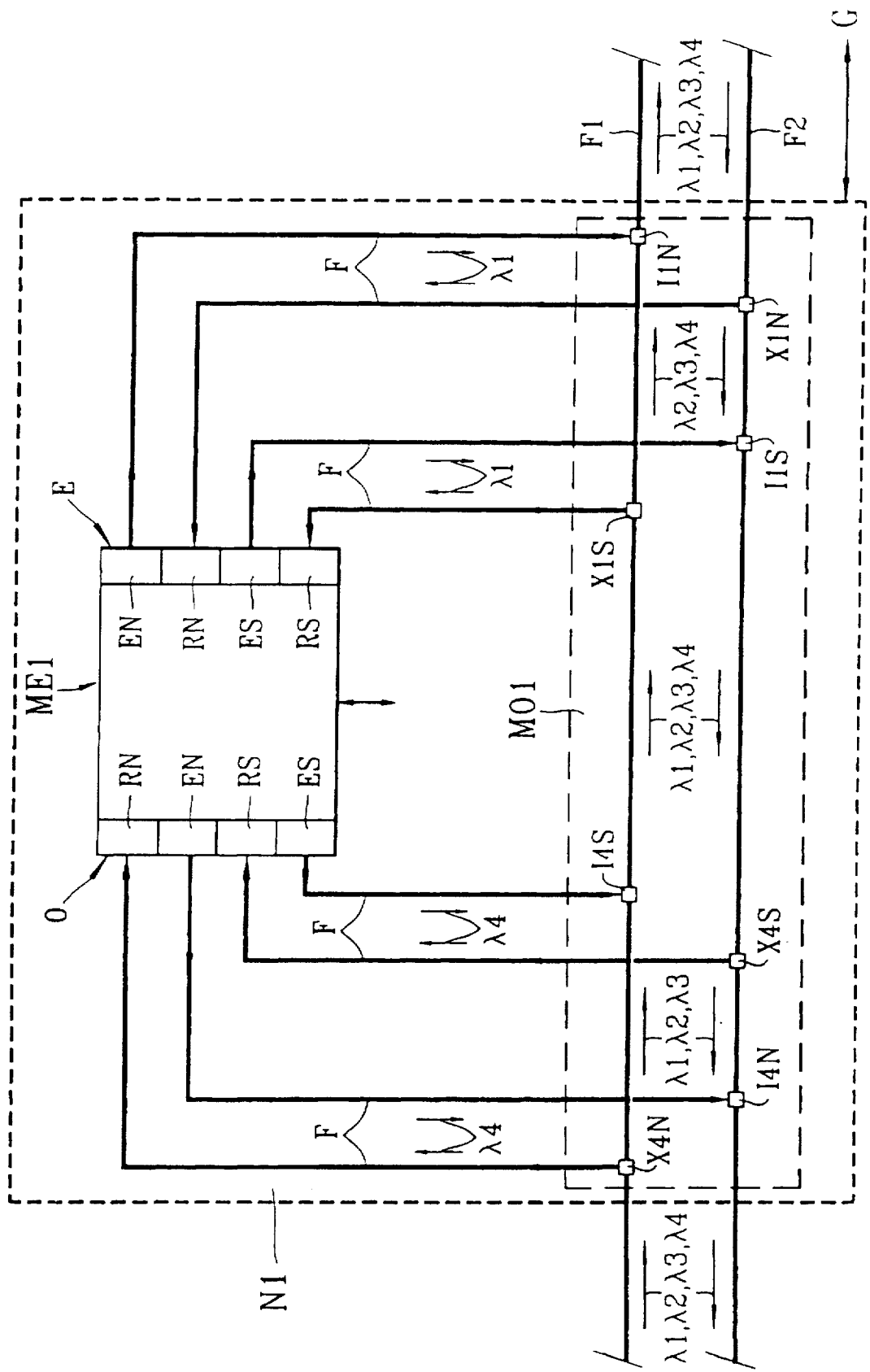
FIG. 2 A diagrammatic view of one of the nodes of the network shown in FIG. 1.

FIG. 2 shows in greater detail a node of the network of FIG. 1. In the example of FIG. 2, it is the node N1, but on the basis of this description of FIG. 2, the expert can deduce the construction of the other network nodes N2 to N4.

The east interface E of the ADM designated ME1 in FIG. 2 comprises a transmitter EN of informations in optical form at the wavelength $\lambda 1$ and intended for the node N2.

The associated OADM, designated M01, comprises an adding means I1N (multiplexer) connected to the transmitter EN by one of the fibres F and intended to insert said informations into the fibre F1.

The east interface E also comprises a receiver RN of informations in optical form at wavelength $\lambda 1$ coming from the node N2 and intended for the node N1.

The OADM of FIG. 1 also comprises a dropping means X1N (filter) with respect to said informations propagating in the fibre F2 in order to supply them to the receiver RN by means of one of the fibres F.

The west interface 0 of the ADM of FIG. 2 comprises a transmitter EN of informations in optical form at wavelength $\lambda 4$ intended for the node N4.

The OADM of FIG. 2 also comprises another adding means 14N (multiplexer) connected to the transmitter EN of said west interface 0 by one of the fibres F and intended to insert said informations in the fibre F2.

The west interface 0 also comprises another receiver RN of informations at optical form and at wavelength $\lambda 4$ coming from the node N4 and intended for the node N1.

The OADM of FIG. 2 also comprises a dropping means X4N (filter) connected by one of the fibres F to said other receiver RN and making it possible to drop from the fibre F1 the informations coming from the node N4.

In the examples of FIGS. 1 and 2 use is made of the same wavelength for transmitting informations from one node to another and vice versa.

For example, use is made of the wavelength $\lambda 1$ for transmitting informations from the east interface E of the node N1 to the west interface 0 of the node N2 and vice versa.

This makes it possible to use transmitters EN (lasers) having the same characteristics for the east interface E of the node N1 and for the west interface 0 of the node N2 and optical devices having the same characteristics in the OADM's respectively associated with said nodes N1 and N2 for extracting the wavelength $\lambda 1$.

In a not shown example use is made of a given wavelength for the transmission of informations from one node to another and a different wavelength for the reverse transmission.

Returning to the network of FIG. 1, the direct traffic is protected against a traversed node, transmission card or route breakdown or failure.

The term direct traffic is understood to mean the informations coming from a node and intended for a node associated therewith.

It is pointed out that in the case of the SDH standard, the multiplex section protection MSP is intended to give a total protection of a link on a point-by-point basis using a redundancy of the transmission and reception interfaces and a redundancy of the transmission support.

For the ring network of FIG. 1 which uses two optical fibres, each forming a ring, the ADM's are designed and cooperate with the fibres F1 and F2 so as to be able to use the MSP 1+1 for protecting each optical line section, i.e. each direct logic link between two ADM's (which can traverse one or more OADM's) against an optical fibre breakage or a traversed OADM failure.

Reference should again be made to FIG. 2 for explaining the design of the ADM designated ME1 for implementing said protection. From this the expert can deduce the design of the other network ADM's.

FIG. 2 shows that the east interface E of said ADM comprises, apart from the transmitter EN or "normal transmitter" another transmitter ES or "standby transmitter".

The latter also transmits informations in optical form at wavelength $\lambda 1$, intended for the node N2 at the same time as said informations are being transmitted by the transmitter EN.

The OADM associated with said ADM comprises an insertion means I1S (multiplexer) connected by means of one of the optical fibres F to the transmitter ES and which is intended to add to the fibre F2 said informations at wavelength $\lambda 1$.

It can be seen that the east interface E also comprises, apart from the receiver RN or normal receiver, another receiver RS or standby receiver for receiving the informations in optical form of wavelength $\lambda 1$ coming from the node N2 and intended for the node N1.

The OADM of FIG. 2 also comprises another dropping means X1S (filter) intended to drop from the fibre F1 informations coming from the node N2 in order to supply them to said receiver RS via one of the fibres F.

Apart from its transmitter EN or normal transmitter, the west interface O of the ADM designated ME1 comprises another transmitter ES or standby transmitter for transmitting informations in optical form at wavelength $\lambda 4$ intended for the node N4 at the same time as said informations are being transmitted by the transmitter EN of the west interface O.

The associated OADM also comprises another adding means I4S (multiplexer) connected by one of the optical fibres F to said transmitter ES and intended for adding said informations to the fibre F1.

Apart from its receiver RN, the west interface O also comprises another receiver RS or a standby receiver for receiving informations in optical form at wavelength $\lambda 4$ from node N4.

The associated OADM also comprises another dropping means X4S (filter) connected to said other receiver RS by one of the fibres F and intended to drop from the fibre F2 the informations, at wavelength $\lambda 4$, coming from the node N4.

Figure 4:
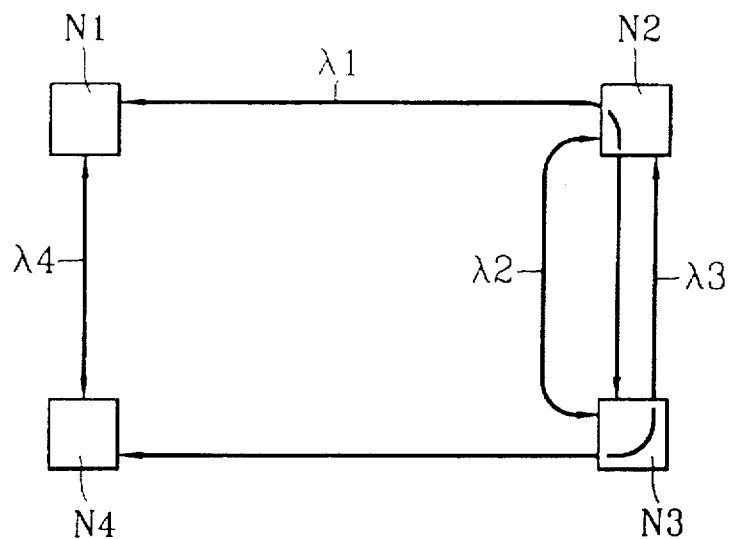
FIG. 4 A diagrammatic view of another embodiment of the invention.

This direct traffic protection will be better understood by referring to FIG. 4, which diagrammatically illustrates the protection of the direct traffic from node N1 to node N2.

Figure 3:
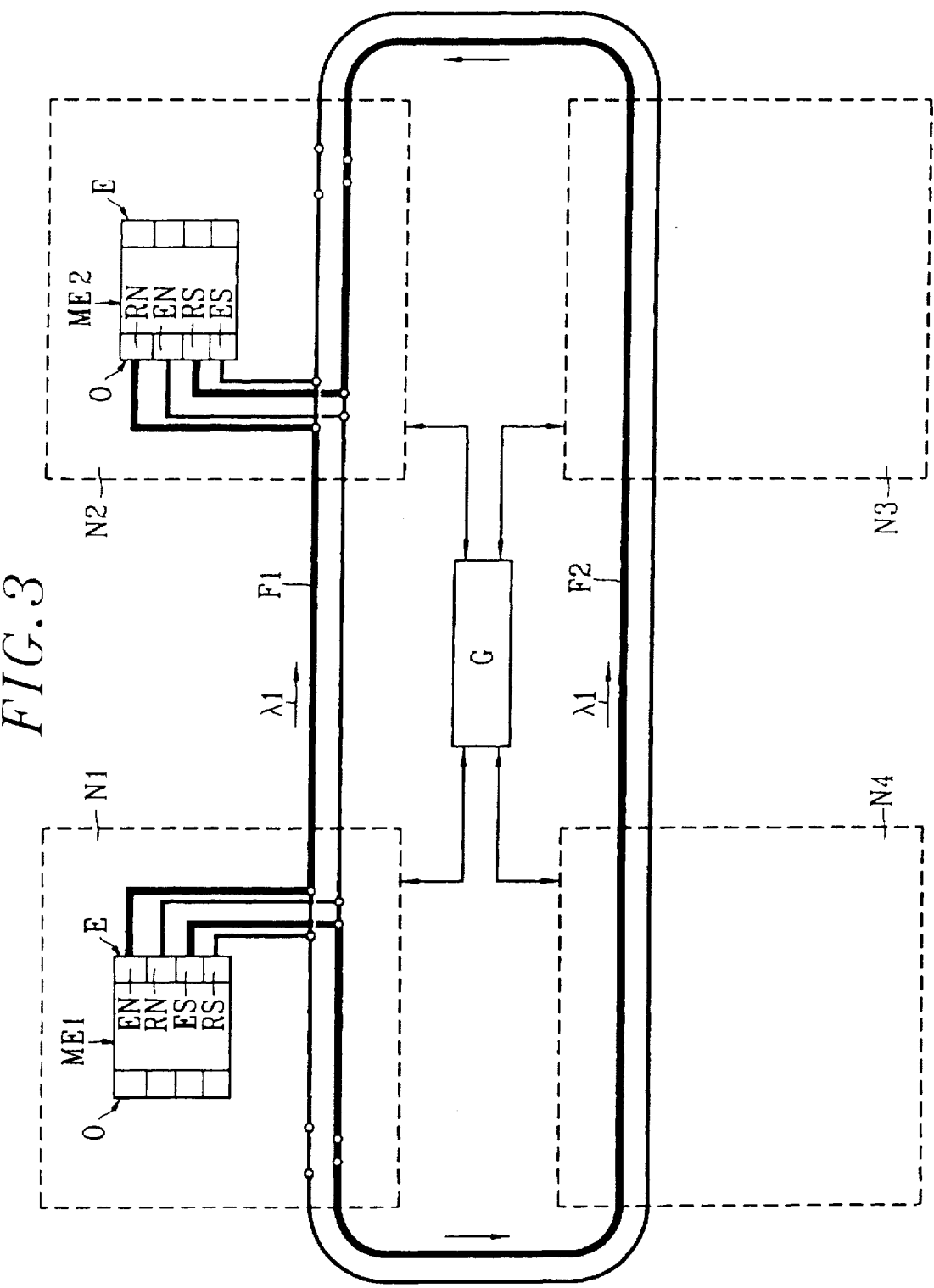
FIG. 3 Diagrammatically the normal circuit and standby circuit used in the network of FIG. 1.

The addition of standby transmitters and receivers in ADM's means that there is not only a normal circuit, but also a standby circuit for each direct traffic. FIG. 3 shows the normal circuit for the informations transmitted by the node N1 and intended for node N2.

This normal circuit passes from the transmitter EN of the east interface E of the ADM of the node N1 to the receiver RN of the west interface O of the ADM of the node N2 via fibre F1.

It is also possible to see the standby circuit for these informations transmitted by node N1 and intended for node N2. This standby circuit passes from the transmitter ES of the east interface E of the ADM of node N1 to the receiver RS of the west interface O of the ADM of node N2 via fibre F2.

For the clarity of FIG. 3, all that is shown in thick line form is the normal circuit and the standby circuit for said traffic from node N1 to node N2 at wavelength $\lambda 1$.

With respect to the traffic from node N2 to node N1, at wavelength $\lambda 1$, it is pointed out that the normal circuit passes from the normal transmitter of the west interface O of the ADM of node N2 to the normal receiver RN of the east interface E of the ADM of node N1 via optical fibre F2.

The standby circuit relative to this direct traffic from node N2 to node N1 at wavelength $\lambda 1$ passes from the standby transmitter ES of the west interface of node N2 to the standby receiver RS of the east interface of node N1 via fibre F2.

From the following description relative to the direct traffic standby circuit and normal circuit between nodes N1 and N2, the expert can easily gather the normal circuit and standby circuit for each of the other direct traffics of the network of FIG. 1.

The use of a normal circuit and a standby circuit makes it possible to implement the MSP 1+1 for protecting an optical line section. The management means G are adapted to said MSP 1+1.

The transmitters and receivers of the east interface E of the ADM of node N1 and the transmitters and receivers of the west interface O of the ADM of node N2 are provided with a 1+1 line MSP.

The same applies for each interface of each ADM of the network, which protects the optical line sections against a traversed node, transmission card or route breakdown or failure.

In the example described, the wavelength relative to a normal circuit and the wavelength relative to the corresponding standby circuit are identical. However, it would be possible to use different wavelengths for said normal and standby circuits without disturbing the operation of the protection.

In a network according to the invention, the links between the nodes of said network do not necessarily have any relationship with the physical structure of the optical ring of the network.

The use of different wavelengths, at the rate of one wavelength per logic link between two nodes, gives a greater flexibility in the configuration of the network with a view to optimizing the latter. It is in fact possible to adapt the optical line sections to the highest volume traffics in the ring.

It is pointed out that an optical line section is a direct logic link between two network nodes, which can be adjacent or non-adjacent in said network.

This advantage is diagrammatically illustrated in FIG. 4 where, unlike in FIG. 1, the logic links are not established between adjacent nodes of the network.

In the example of FIG. 4, it is assumed that traffic is high between nodes N1 and N3, between nodes N3 and N2, between nodes N2 and N4 and between nodes N4 and N1.

A first logic link at wavelength λ1 is then established between node N1 (east interface of the corresponding ADM) and node N3 (west interface of the corresponding ADM).

A second logic link is established at wavelength λ2 between node N3 (east interface of the corresponding ADM) and node N2 (west interface of the corresponding ADM).

A third logic link at wavelength λ3 is established between node N2 (east interface of the corresponding ADM) and node N4 (west interface of the corresponding ADM).

A fourth logic link at wavelength λ4 is established between node N4 (east interface of the corresponding ADM) and node N1 (west interface of the corresponding ADM).

It is obviously then appropriate to modify the OADM's of the network (compared with the case of FIG. 1) so that they are adapted to this new configuration.

Moreover, in the present invention, because an ADM can be connected at the most to two other ADM'S, it is not possible to have an optical line section for each of the traffics between nodes. This is e.g. produced in the case where the given node must communicate with more than two other nodes.

In the same way as in a conventional, electronic SDH ring, use is then made of a mixing of paths transiting by an ADM. It is pointed out that each ADM comprises an electronic mixing matrix.

For example and on returning to FIG. 1, where there is no optical line section between the nodes N1 and N3, a traffic between node N1 and node N3 is then relayed by the node N2, because the optical line sections between the nodes N1 and N2 and between nodes N2 and N3 already exist.

In this case, all information transmitted by the node N1 and intended for node N3 firstly passes from node N1 to node N2 at wavelength λ1 and is then appropriately mixed in the ADM of node N2 and is then retransmitted at wavelength λ2 in the direction of node N3.

The protection of the network of FIG. 1 is also adapted to the traffic relayed by the network nodes. In other words, the traffic which is relayed by an intermediate node is also protected against a failure thereof.

The MSP referred to hereinbefore only protects one optical line section. For the protection of the relayed traffic, use is made of a mechanism of the SDH, which is called "path protection".

The traffic transported by a path is, according to this mechanism, transmitted simultaneously by the east interface and the west interface of the ADM constituting the originator of the traffic. The latter is thus duplicated and mixed by separate nodes.

For example, in the case where the node N2 relays the traffic from node N1 intended for node N3, the informations transmitted by node N1 and intended for node N3 are transmitted by the east interface E of the ADM of node N1 and also by the west interface 0 of said ADM.

The OADM's of the network of FIG. 1 have a structure adapted to a protection in the case of a failure of a component of said OADM's.

Thus, using the example of the OADM of FIG. 2, said OADM comprises, in association with the east interface of the corresponding ADM:

two multiplexers for the insertion of informations at wavelength λ1 (normal circuit and standby circuit) and two filters for the extraction of informations at said wavelength λ1 (normal circuit and standby circuit).

This OADM also comprises two other filters and two other multiplexers associated with the west interface of the corresponding ADM and operating at wavelength λ4 in the example of FIG. 2.

The OADM of each node thus comprises four add multiplexers and four drop filters.

With such an OADM structure, the MSP protects the network with respect to the breaking of a random component of said OADM.

Figure 5:
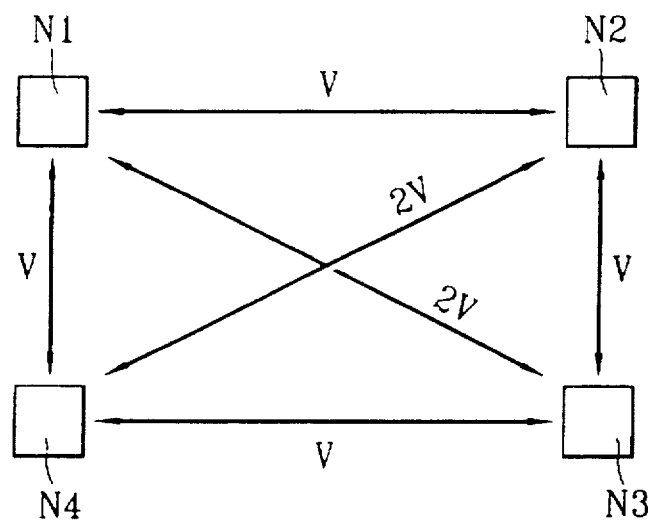
FIG. 5 A traffic matrix usable with said network.
Figure 6:
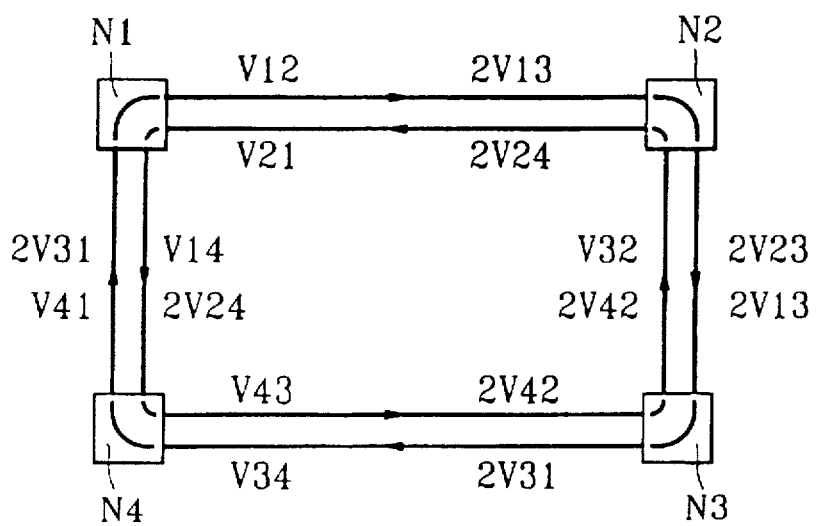
FIG. 6 The advantage of the invention for the implementation of this traffic matrix compared with a known network using electronic technology.

With reference to FIGS. 5 and 6, an explanation is given of the interest of the present invention with regards to the useful traffic capacity for ADM's.

FIG. 5 is a traffic matrix example between four nodes N1 to N4 of a ring network. In FIG. 5 there are virtual containers V (of type VC4 in this example), which are to be exchanged between the network nodes. For example, a virtual container is to be exchanged between nodes NI and N2 and two virtual containers are to be exchanged between nodes N2 and N4.

A total path protection, conventional electronic ring network requires the installation in this example of seven ADM's STM-4 on two optical rings passing through said four nodes.

FIG. 6 illustrates a network according to the invention having four nodes N1 to N4 and of the type of FIG. 1. This network requires only four ADM's (at a rate of one ADM per node) for implementing said traffic matrix.

The corresponding virtual container exchanges are indicated in FIG. 6 in which:

the symbol Vij, where i and j assume values 1 to 4, represents the dispatch of a virtual container from node Ni to node Nj and symbol 2Vij represents the dispatch of two virtual containers from node Ni to node Nj.

For example, FIG. 6 shows that node NI supplies a virtual container (V12) to node N2 and vice versa. Node N2 supplies two virtual containers (2V24) to node N4 and vice versa.

FIG. 4 only shows the normal circuits relative to the considered traffic matrix. The latter can thus be resolved, according to the present invention, with four type STM-4 ADM's, whose line interface cards are equipped with the MSP securizing option, with two wavelengths allocated as a function of the choice used for the network architecture.

It should be noted that the ADM's operate under the same conditions as in a standard architecture.

The signals arriving at one of the interfaces of such an ADM are processed within it in order to be derived as tributaries or directly supplied to the other interface.

In the example of FIGS. 1 and 3, each OADM implements fixed filterings and total dropping of wavelength.

It is also possible to obtain a ring structure according to the invention using OADM's, whose filtering is wavelength-tunable.

Management means G are then provided for controlling the wavelength-tunable filters.

This gives a network implemented with standard electronic equipments, but whose architecture can be optically reconfigured. It is then possible to modify the links between the nodes as a function of the traffic.

For example, on the basis of an architecture in which a link is established between the nodes N1 and N2 at the wavelength λ1, it is possible to pass to an architecture where a link is established between the nodes N1 and N3 at this wavelength.

The above examples of the invention more particularly refer to the SDH standard. Obviously the invention can also be applied to the SONET standard, which is very close to the SDH standard.

The following documents are referred to in the present description:

(1) A. F. Elrefaie et al, "Fibre amplifiers in closed ring WDM networks", Electron. Lett., vol. 28, pp 2340–2341, 1992

(2) A. Hamel, D. Laville et al, "Multilayer Add-Drop Multiplexers in a self-healing WDM Ring Network", OFC'95, pp 84 and 85

(3) J. L. Archambault et al, "Novel channel dropping filter by grating frustrated coupling in single mode optical fiber", OFC'94, TuL5

(4) J. E. Baran, D. A. Smith, A. D'Alessandro, "Multiwavelength performance of a apodized acousto-optic switch", OFC'94, pp 57–58

(5) A. F. Elrefaie, "Multiwavelength survivable ring network architectures", I.C.C. 93, pp 1245–1251

(6) M. J. Chawki, V. Tholey et al, "Demonstration of a WDM Survivable open ring network using reconfigurable channel dropping receivers", ECOC 94, pp 897–900.

We claim:

1. Ring network intended for the transmission of informations in optical form and which are wavelength multiplexed, said network incorporating optically interconnected nodes (N1, N2, N3, N4) and being characterized in that it also comprises:

a first optical fibre (F1) forming a ring, which successively passes through the nodes of the network and which is to be traversed by the informations in a first direction, a second optical fibre (F2) forming a ring and which passes successively through the nodes of the network and which is traversed by the informations in a second direction opposite to the first direction, electronic add-drop multiplexers (ME1, ME2, ME3, ME4), known as ADM, each ADM being able to supply informations to other ADM's of the network, respectively at given wavelengths, each ADM incorporating:

a first aggregate interface (E) for the transmission of informations to be added in the first fibre (F1) in the direction of an associated ADM and the reception of informations dropped from the second fibre (F2) and coming from the said associated ADM, and a second aggregate interface (0) for the transmission of informations to be added in the second fibre (F2), in the direction of another associated ADM and for the reception of informations dropped from the first fibre (F1) and coming from said associated other ADM, optical add-drop multiplexers (M01, M02, M03, M04) known as OADM's, respectively associated with the ADM's, each OADM being able to add to the first and second fibres the informations coming from the associated ADM and drop from said fibres the informations intended for said associated ADM and means (G) for managing the network, a configuration of the network defining a bidirectional link between an interface of each ADM and an interface of the associated ADM, one transmission wavelength being allocated to each interface.

2. Network according to claim 1, characterized in that it is adapted to the synchronous digital hierarchy transmission standard.

3. Network according to claim 2, characterized in that, in each ADM, the first aggregate interface (E) is also able
      to transmit informations in the direction of the associated ADM by means of the second fibre (F2) and receive the informations coming from said associated ADM by means of the first fibre (F1) and the second aggregate interface (0) is also able
      to transmit informations in the direction of the other associated ADM by means of the first fibre (F1) and receive the informations coming from said other associated ADM by means of the second fibre (F2), each bidirectional link between two nodes being autosecurized by 1+1 multiplex section protection.

4. Network according to claim 3, characterized in that, for each ADM (ME1, ME2, ME3, ME4), the transmissions of informations intended for an associated ADM by means of the first fibre (F1) and the second fibre (F2) take place at the same wavelength.

5. Network according to claim 1, characterized in that, for each ADM (ME1, ME2, ME3, ME4), the transmission of informations intended for an associated ADM and the transmission informations from said associated ADM intended for said ADM take place at the same wavelength.

6. Network according to claim 1, characterized in that, for each ADM (ME1, ME2, ME3, ME4), the transmission of informations intended for an associated ADM and the transmission of informations from said associated ADM and intended for said ADM take place at different wavelengths.

7. Network according to claim 1, characterized in that at least one of the ADM's (ME1, ME2, ME3, ME4) also makes it possible to relay informations coming from another ADM and intended for an ADM associated with said other ADM.

8. Network according to claim 2, characterized in that at least one of the ADM's (ME1, ME2, ME3, ME4) also makes it possible to relay informations coming from another ADM and intended for an ADM associated with said other ADM and in that the informations are transmitted by said other ADM both by the first aggregate interface (E) and the second aggregate interface (0) of said other ADM.

9. Network according to claim 1, characterized in that at least one of the links is established between two physically non-adjacent nodes of the network.

10. Network according to claim 1, characterized in that the OADM's (M01, M02, M03, M04) incorporate optical devices making it possible to add and drop fixed wavelengths.

11. Network according to claim 1, characterized in that the OADM's incorporate tunable optical devices for adding and dropping wavelengths which can in this way be selected.

* * * * *